(12) United States Patent
Toya

(10) Patent No.: US 7,779,980 B2
(45) Date of Patent: Aug. 24, 2010

(54) WET MULTI-PLATE CLUTCH

(75) Inventor: Ritsuo Toya, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 504 days.

(21) Appl. No.: 11/730,673

(22) Filed: Apr. 3, 2007

(65) Prior Publication Data

US 2007/0246321 A1   Oct. 25, 2007

(30) Foreign Application Priority Data

Apr. 4, 2006   (JP) .............................. 2006-103372

(51) Int. Cl.
   *F16D 13/64* (2006.01)
(52) U.S. Cl. ................. 192/70.14; 192/107 R
(58) Field of Classification Search ............... 192/70.14
   See application file for complete search history.

(56) References Cited

U.S. PATENT DOCUMENTS

| | | | |
|---|---|---|---|
| 6,062,367 A | 5/2000 | Hirayanagi et al. | |
| 6,397,997 B2 * | 6/2002 | Kato | 192/70.14 |
| 6,702,088 B2 | 3/2004 | Kitaori et al. | |
| 2004/0069586 A1 | 4/2004 | Sasse | |
| 2004/0121145 A1 | 6/2004 | Kawabata et al. | |
| 2007/0151822 A1 | 7/2007 | Toya et al. | |
| 2007/0187206 A1 * | 8/2007 | Toya | 192/107 R |
| 2007/0251795 A1 * | 11/2007 | Toya | 192/70.12 |

FOREIGN PATENT DOCUMENTS

| | | |
|---|---|---|
| JP | 63-297832 | 12/1988 |
| JP | 11-141570 | 5/1999 |

* cited by examiner

*Primary Examiner*—Richard M. Lorence
(74) *Attorney, Agent, or Firm*—Miles & Stockbridge P.C.

(57) ABSTRACT

The present invention provides a wet multi-plate clutch comprising an external toothed plate formed by sticking a friction material to a core plate and an internal toothed plate formed by sticking a friction material to a core plate and designed so that torque is transmitted by engaging the external toothed plate with the internal toothed plate and wherein the friction materials are stuck to opposed surfaces where the external toothed plate is opposed to the internal toothed plate, and surfaces of the core plates to which the friction materials are stuck are provided with a plurality of surfaces offset axially.

13 Claims, 3 Drawing Sheets

WET MULTI-PLATE CLUTCH

BACKGROUND OF THE INVENTION

1. Field of the Invention

The present invention relates to a wet multi-plate clutch used in a clutch and/or a brake of an automatic transmission (AT) of a vehicle.

2. Related Background Art

Conventional wet multi-plate clutches used in automatic transmissions generally comprise separator plates as external toothed plates and friction plates as internal toothed plates constructed by sticking friction materials to core plates, and are designed to transmit torque by engaging the external toothed plates with the internal toothed plates.

In the past, as shown in Japanese Patent Application Laid-open No. 11-141570 (1999), a wet multi-plate clutch constituted by sticking friction materials to both surfaces of friction plates as internal toothed plates is known. Further, a clutch design of one-surface alternate sticking type in which friction materials are stuck to surfaces of the internal toothed plates and the external toothed plates which are not opposed to each other is also known.

However, in recent years, in order to reduce fuel consumption of a vehicle, it has been requested that the vehicle be made more compact and lighter, and an automatic transmission be made more compact and lighter to reserve the interior space of the vehicle, and also, an axial dimension of a wet multi-plate clutch used in the automatic transmission be made smaller.

In the conventional clutches, it is contemplated that a plate thickness of the core plate is decreased in order to reduce an axial dimension of a clutch pack; however, if the plate thickness of the core plate is decreased, heat resistance is reduced due to reduction of a heat absorbing ability of the metallic surface of the external toothed plate associated with the friction material, and, since the plate thickness is small, a face-pressure of the engagement surfaces between the internal toothed plate and the hub is increased and a face-pressure of the engagement surfaces between the external toothed plate and the clutch drum is increased, with the result that inconvenience such as indentation is generated at the engagement surfaces. Thus, the reduction of the plate thickness causes a problem.

Further, it has been requested that the axial length of the entire clutch be shortened, without reducing a heat dispersing amount of the external toothed plate to enhance the heat resistance.

SUMMARY OF THE INVENTION

Accordingly, an object of the present invention is to provide a wet multi-plate clutch which tooth face-pressures of an internal toothed plate and an external toothed plate can be reserved, and, since friction heat is absorbed at both surfaces of the internal and external toothed plates, heat resistance is not reduced and the tooth face-pressures can be optimized, thereby preventing indentation.

To achieve the above object, the present invention provides a wet multi-plate clutch comprising an external toothed plate and an internal toothed plate which are formed by sticking friction materials to core plates, respectively, and designed so that torque is transmitted by engaging the external toothed plate with the internal toothed plate and wherein the friction materials are stuck to opposed surfaces where the external toothed plate is opposed to the internal toothed plate, and surfaces of the core plates to which the friction materials are stuck are provided with a plurality of surfaces offset axially.

According to the wet multi-plate clutch of the present invention as mentioned above, the following advantages can be obtained.

Since the tooth face-pressures of the internal toothed plate and the external toothed plate can be reserved and the friction heat is absorbed from the both surfaces of the internal toothed plate and the external toothed plate, the heat resistance is not reduced and the tooth face-pressures can be optimized, thereby preventing the indentation.

In particular, by sticking the friction material to the internal toothed plate at its outer diameter side and sticking the friction material to the external toothed plate at its inner diameter side, tooth thicknesses of engagement portions of both plates can be reserved. Further, if one of the opposed friction materials is deformed or worn, the face-pressure of the other friction material of the opposed plate is increased, so that the thicknesses of the opposed friction materials are self-controlled with each other, with the result that, even during the use of the plates, evenness of the thicknesses of the opposed friction materials can be maintained and the respective opposed friction materials support respective predetermined face-pressures, thereby enhancing the reliability of the clutch.

Since the internal and external toothed plates are provided with recessed stepped portions to which the friction materials are stuck and the corresponding metal friction surfaces are adapted to be engaged with the friction materials on the recessed portions, i.e., since it is designed so that, even if the friction material is deformed or worn by an amount greater than the depth of the recessed portion, the opposed metal friction surfaces do not interfere with each other, the axial length can be reduced between the opposed surfaces of the external toothed plate and the internal toothed plate by an amount corresponding to the height of the offset recessed portion. That is to say, when it is assumed that the number of sets of opposed friction surfaces is N and the height of the recessed portion is h, the axial length of the entire wet multi-plate clutch can be reduced by an amount of N×h.

The term "internal toothed plate" used in this specification means a plate provided at its inner periphery with spline teeth and mounted on an inner hub of the wet multi-plate clutch for an axial movement and the term "external toothed plate" means a plate provided at its outer periphery with spline teeth and mounted within an outer clutch case of the wet multi-plate clutch for an axial movement. Functions of the internal toothed plate and the external toothed plate are not necessarily the same as those of "separator plate" and "friction plate" which have been used generally and may differ from the latter in some points.

Further features of the present invention will become apparent from the following description of exemplary embodiments (with reference to the attached drawings).

DETAILED DESCRIPTION OF THE PREFERRED EMBODIMENTS

Figure 1:
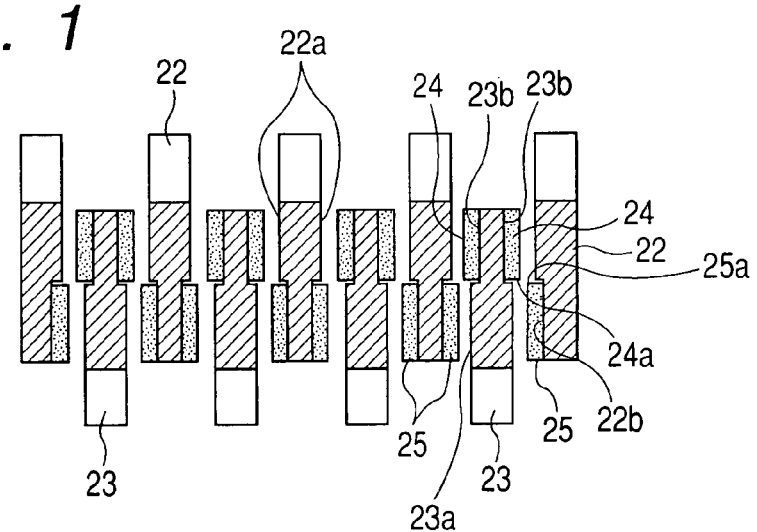
FIG. 1 is a sectional view showing details of external toothed plates and internal toothed plates according to a first embodiment of the present invention.

Now, various embodiments of the present invention will be fully explained with reference to the accompanying drawings. Incidentally, in the drawings, the same elements are designated by the same reference numerals.

Figure 6:
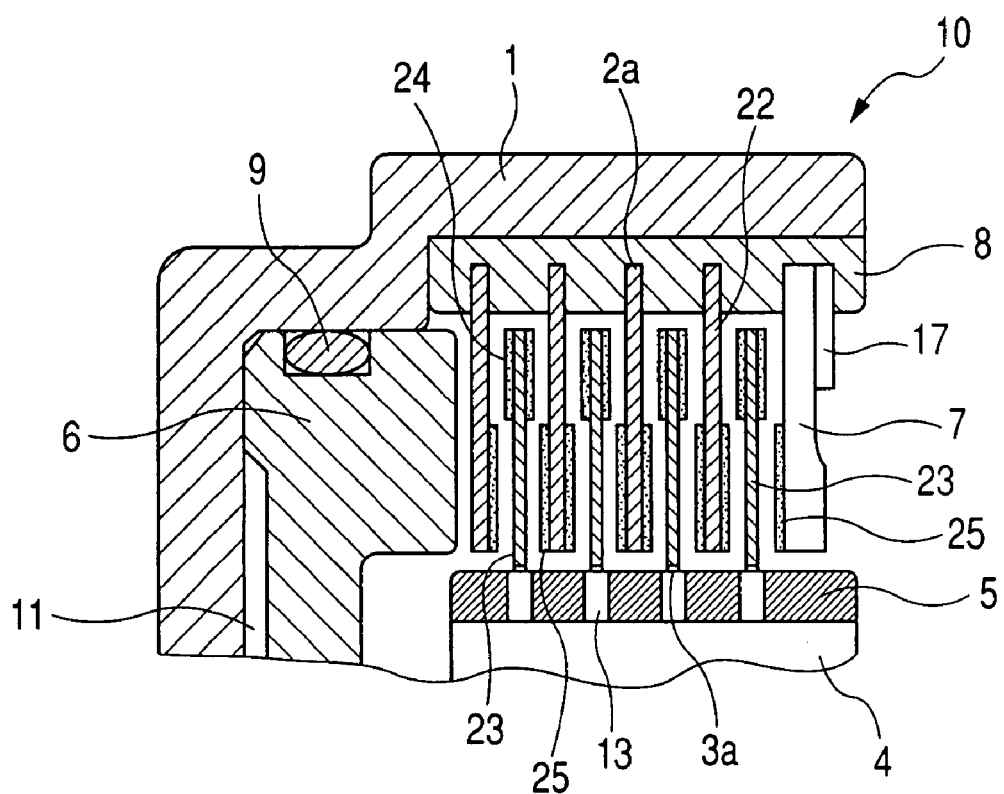
FIG. 6 is an axial partial sectional view for explaining a fundamental construction of a wet multi-plate clutch applicable to various embodiments of the present invention.

FIG. 6 is an axial partial sectional view for explaining a fundamental construction of a wet multi-plate clutch applicable to various embodiments of the present invention. Incidentally, here, an external toothed plate 22 and an internal toothed plate 23 each has a construction of a first embodiment of the present invention.

A wet multi-plate clutch 10 comprises a substantially cylindrical drum or clutch case 1 having one axial open end, a hub 4 mounted within the clutch case 1 in coaxial with the clutch case for a relative rotation, annular external toothed plates 22 mounted to a spline member 8 provided on an inner periphery of the clutch case 1 for an axial movement, and annular internal toothed plates 23 arranged alternately with the external toothed plates 22 in an axial direction and mounted to a spline member 5 provided on an outer periphery of the hub 4 and to which friction materials are stuck. Plural external toothed plates 22 and plural internal toothed plates 23 are provided.

The wet multi-plate clutch 10 further comprises a piston 6 for urging the external toothed plates 22 and the internal toothed plates 23 to engage these plates with each other, a backing plate 7 provided on the inner periphery of the clutch case 1 to fixedly hold the external toothed plates 22 and the internal toothed plates 23 at an axial one end, and a stop ring 17 for holding the backing plate.

As shown in FIG. 6, the piston 6 is disposed within a closed end portion of the clutch case 1 for an axial sliding movement. An O-ring 9 is disposed between an outer peripheral surface of the piston 6 and the inner surface of the clutch case 1. Further, a seal member (not shown) is also disposed between an inner peripheral surface of the piston 6 and an outer peripheral surface of a cylindrical portion (not shown) of the clutch case 1. Accordingly, an oil-tight hydraulic chamber 11 is defined between an inner surface of the closed end portion of the clutch case 1 and the piston 6.

Friction materials 25 having predetermined coefficient of friction are fixed to both surfaces of each of the internal toothed plates 23. Further, friction materials 24 are fixed to both surfaces of the external toothed plates 22. Further, lubricating oil supply ports 13 are provided in the hub 4 to extend through the hub in a radial direction so that lubricating oil can be supplied to the wet multi-plate clutch 10 from the inner diameter side to the outer diameter side.

In the wet multi-plate clutch 10 having the above-mentioned arrangement, the clutch is engaged (tightened) and disengaged (released) in the following manner. A condition of FIG. 6 is a clutch released condition in which the external toothed plates 22 and the internal toothed plates 23 are separated from each other. In the released condition, the piston 6 abuts against the inner surface of the closed end portion of the clutch case 1 by a biasing force of a return spring (not shown).

From this condition, in order to engage or tighten the clutch, hydraulic pressure is applied to the hydraulic chamber 11 defined between the piston 6 and the clutch case 1. As the hydraulic pressure is increased, the piston 6 is shifted to the right (FIG. 6) in the axial direction in opposition to the biasing force of the return spring (not shown), thereby closely contacting the external toothed plates 22 with the internal toothed plates 23. In this way, the clutch is tightened or engaged.

After the engagement, in order to release the clutch again, the hydraulic pressure in the hydraulic chamber 11 is released. When the hydraulic pressure is released, the piston 6 is shifted by the biasing force of the return spring (not shown) until it abuts against the inner surface of the closed end portion of the clutch case 1. In this way, the clutch is released or disengaged.

First Embodiment

FIG. 1 is a sectional view showing details of external toothed plates 22 and internal toothed plates 23 of a wet multi-plate clutch according to a first embodiment of the present invention. Friction materials 25 are stuck, by an adhesive and the like, to innermost diameter sides of a plurality of external toothed plates 22 disposed at a predetermined interval along an axial direction. In various embodiments shown in FIGS. 1 to 5, the clutch released condition is shown. That is to say, in this condition, the internal toothed plates are not engaged with the external toothed plates.

Further, friction materials 24 are stuck, by an adhesive and the like, to outermost diameter sides of a plurality of internal toothed plates 23 disposed at a predetermined interval along an axial direction. As shown, the external toothed plates 22 and the internal toothed plates 23 have substantially the same axial thicknesses and are arranged alternately along the axial direction.

As can be seen from FIG. 1, in each of axially-outermost plates among the plural external toothed plates 22, the friction material 25 is stuck only to the surface opposed to the corresponding internal toothed plate 23. Further, regarding the other external toothed plates 22 (intermediate external toothed plates), the friction materials 25 are stuck to both axial surfaces of each plate. The reason is that both surfaces of the intermediate external toothed plates are opposed to the associated internal toothed plates 23.

To the contrary, the friction materials 24 are stuck to both axial surfaces of all internal toothed plates 23. Thus, the friction materials 24 are stuck to all of the surfaces opposed to the external toothed plates 22 including the axially-outermost external toothed plates 22.

Inner diameter side edge portions 24a of the friction materials 24 provided on the internal toothed plates 23 are positioned not to interfere with outer diameter side edge portions 25a of the friction materials 25. That is to say, a predetermined radial clearance or gap is provided between the edge portion 24a and the edge portion 25a. Accordingly, the clutch can be tightened without any interference between the friction materials 24 and the friction materials 25.

The external toothed plates 22 have axially offset surfaces 22b on their friction surfaces 22a opposed to the internal toothed plates 23. Each surface 22b is formed as a recessed portion to which the friction material 25 is stuck. Regarding each of the axially-outermost external toothed plates 22 of the wet multi-plate clutch 10, the surface 22b is provided only in the surface of the plate opposed to the corresponding internal toothed plate 22, and, regarding each of the other external toothed plates 22, the surfaces 22b are provided in both axial surfaces (front and rear surfaces) of the plate.

The internal toothed plates 23 have axially offset surfaces 23b on their friction surfaces 23a opposed to the external toothed plates 22. Each surface 23b is formed as recessed portion to which the friction material 24 is stuck. The surfaces 23b are provided in both axial surfaces (front and rear surfaces) of all of the internal toothed plates 23.

Axial thicknesses of the friction material 24 and the friction material 25 are substantially the same and heights of the surfaces 23b and 22b to which the friction material 24 and the friction material 25 are stuck, respectively, are also substantially the same. Further, a stepped portion between the friction surface 22a and the surface 22b is offset from a stepped portion between the friction surface 23a and the surface 23b in the radial direction so that the friction surfaces 22a and 23a as exposed metal surfaces of the core plates are not directly contacted with each other.

As shown in FIG. 1, the surfaces of the friction materials 24 and 25 which are opposed to the friction surfaces of the corresponding plates are protruded axially from the respective friction surfaces 23a and 22a.

By designing so that the internal toothed plates and the external toothed plates are provided with the surfaces as the recessed portions to which the friction materials are stuck and that the corresponding metal friction surfaces are opposed to the respective surfaces (recessed portions), i.e., by designing so that, even if the friction material is deformed or worn by an amount greater than the height of the surface (recessed portion), the opposed metal friction surfaces do not interfere with each other, it is possible to reduce the axial length by an amount corresponding to the height of the stepped portion offset in the axial direction, between the opposed surfaces of the external toothed plate and the internal toothed plate. That is to say, when it is assumed that the number of sets of the opposed friction surfaces is N and the height of the recessed portion is h, in the entire wet multi-plate clutch, the axial length can be reduced by N×h in total.

Second Embodiment

Figure 2:
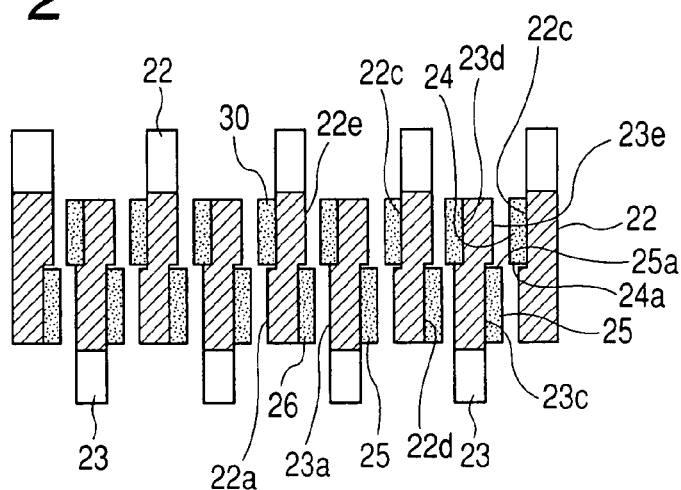
FIG. 2 is a sectional view showing details of external toothed plates and internal toothed plates according to a second embodiment of the present invention.

FIG. 2 is a sectional view showing details of external toothed plates 22 and internal toothed plates 23 of a wet multi-plate clutch according to a second embodiment of the present invention. A fundamental construction of the second embodiment is the same as that of the first embodiment.

In the second embodiment, friction materials 24 are stuck to outer diameter side surfaces 22c of external toothed plates 22 and friction materials 30 are stuck to outer diameter side surfaces 23d of internal toothed plates 23. To the contrary, friction materials 26 are stuck to inner diameter side surfaces 22d of the external toothed plates 22 and friction materials 25 are stuck to inner diameter side surfaces 23c of the internal toothed plates 23. At regions where the surfaces 22c are provided and regions where the surfaces 22d are provided, axial thicknesses of the external toothed plates 22 are substantially the same.

Further, all of the friction materials 24 and 30 provided on the outer diameter sides of the external toothed plates 22 and the internal toothed plates 23 are stuck to the same axial direction (for example, left in FIG. 2) surfaces, and all of the friction materials 25 and 26 provided on the inner diameter sides of the external toothed plates 22 and the internal toothed plates 23 are stuck to the same opposite axial direction (for example, right in FIG. 2) surfaces. Accordingly, regarding the axially-outermost external toothed plates 22, the friction material 24 or the friction material 26 is stuck to only one surface of the plate.

In each of the other external toothed plates 22 between the axially-outermost external toothed plates 22, the friction material 24 is stuck to one axial surface of the plate and the friction material 26 is stuck to the other axial surface. Further, in each of the internal toothed plates 23, the friction material 25 is stuck to one axial surface of the plate and the friction material 30 is stuck to the other axial surface. The positional relationship is as mentioned above. That is to say, the friction materials 24 and 26 are opposed to and adapted to be engaged with an outer diameter side friction surface 23e of the internal toothed plate 23 and an inner diameter side friction surface 23a of the internal toothed plate 23, respectively, and the friction materials 25 and 30 are opposed to and adapted to be engaged with an inner diameter side friction surface 22a of the external toothed plate 22 and an outer diameter side friction surface 22e of the external toothed plate 22, respectively.

As shown, in each of all of the internal toothed plates 23, the inner diameter side surface 23c to which the friction material 25 is stuck and the outer diameter side surface 23d to which the friction material 30 is stuck are offset axially with respect to the friction surfaces 23a and 23e, respectively. Further, an axial thickness of a region of the internal toothed plate 23 where the surface 23c is provided is substantially the same as an axial thickness of a region where the surface 23d is provided.

Similarly, in each of the internal toothed plates 23, the inner diameter side surface 23c to which the friction material 25 is stuck and the outer diameter side surface 23d to which the friction material 30 is stuck are offset axially with respect to the friction surfaces 23e and 23a, respectively.

Similar to the first embodiment, inner diameter side edge portions 24a of the friction materials 24 provided on the external toothed plates 22 are positioned not to interfere with outer diameter side edge portions 25a of the friction materials 25 provided on the internal toothed plates 23. That is to say, a predetermined radial clearance or gap is provided between the edge portion 24a and the edge portion 25a. Accordingly, the clutch can be tightened without any interference between the friction materials 24 and the friction materials 25. Such a relationship is also true between the friction materials 26 and the friction materials 30.

Third Embodiment

Figure 3:
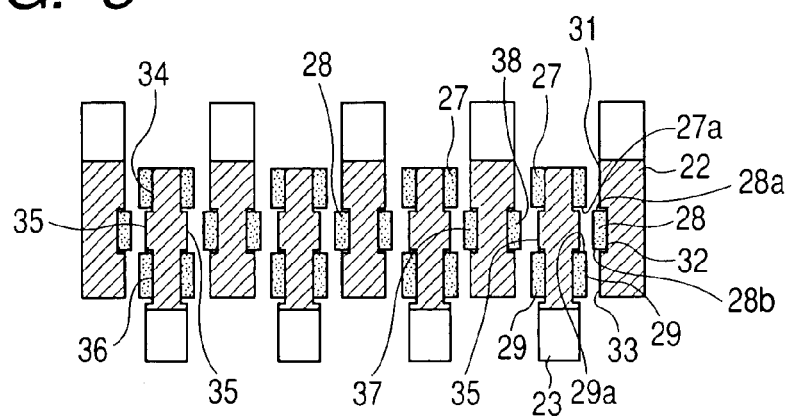
FIG. 3 is a sectional view showing details of external toothed plates and internal toothed plates according to a third embodiment of the present invention.

FIG. 3 is a sectional view showing details of external toothed plates 22 and internal toothed plates 23 of a wet multi-plate clutch according to a third embodiment of the present invention.

The third embodiment differs from the first and second embodiments with respect to a friction material sticking manner. Each of internal toothed plates 23 is provided at its outer and inner diameter sides with pairs of recessed portions 34 and recessed portions 36, respectively, and friction surfaces 35 are defined between the respective recessed portions 34 and 36. Friction materials 27 are stuck to the outer diameter side recessed portions 34 and friction materials 29 are stuck to the inner diameter side recessed portions 36. Further, all of the internal toothed plates 23 have the same constructions regarding both surfaces thereof.

To the contrary, in each of axially-outermost external toothed plates 22, a recessed portion 32 is formed in only one surface of the plate. The recessed portion 32 is located at a substantially middle position of the plate in a radial direction and is substantially opposed to the friction surface 35 of the internal toothed plate 23. A friction material 28 is stuck to the recessed portion 32.

In each of the other (intermediate) external toothed plates 22, recessed portions 37 and 38 are provided in both surfaces of each plate in correspondence to the recessed portions 32. Friction materials 28 are stuck to the recessed portions 37 and 38. The recessed portions 37 and 38 are substantially opposed to the friction surfaces 35 of the internal toothed plates.

A predetermined clearance or gap is provided between an inner diameter side edge portion 27a of a friction material 27 stuck to the outer diameter side of the internal toothed plate 23 and an outer diameter side edge portion 28a of a friction material 28 stuck to the external toothed plate 22 and a predetermined clearance or gap is also provided between an outer diameter side edge portion 29a of a friction material 29 stuck to the inner diameter side of the internal toothed plate 23 and an inner diameter side edge portion 28b of the friction material 28 stuck to the external toothed plate 22.

Axial thicknesses of the friction materials 27, friction materials 28 and friction materials 29 are substantially the same, and heights of the surfaces 34, 37 and 36 for receiving the friction materials 27, friction materials 28 and friction materials 29, respectively, are also substantially the same. Further, a stepped portion between the friction surface 34 and the surface 35 is offset from a stepped portion between the friction surface 36 and the surface 35 in the radial direction so that the friction surfaces 31 and 35 and the friction surfaces 35 and 33 as exposed metal surfaces of the core plates are not directly contacted with each other. Accordingly, the friction surfaces 31, friction surfaces 35 and friction surfaces 33 are engaged with the friction materials on the friction surfaces of the associated plates, without any interference between the friction surfaces, thereby not obstructing the engagement of the clutch.

As can be seen from FIG. 3, a maximum axial thickness of the internal toothed plate 23 is substantially the same as a maximum axial thickness of the external toothed plate 22. A radial width of the friction material 27 is substantially the same as a radial width of the friction material 29; however, a radial width of the friction material 28 is smaller than those of the friction materials 27 and 29. Since the friction materials 27 and 29 are stuck to the internal toothed plate 23, friction areas of the external toothed plate 22 is greater than those of friction areas of the internal toothed plate 23 by 2 times or more. Thus, the friction areas (with which the friction materials are engaged) of the external toothed plate become greater than those of the internal toothed plate. In order to suppress heat unbalance caused by such difference in friction areas, the axial thickness of the external toothed plate 22 can be made greater than the axial thickness of the internal toothed plate 23.

By selecting the thickness of the external toothed plate to become greater than the thickness of the internal toothed plate, heat dispersing abilities of the external toothed plate and the internal toothed plate can be equalized, thereby enhancing the heat resistance. The reason is that the external toothed plate is engaged or contacted with an element such as the clutch case or the transmission case having a heat capacity greater than that of the clutch hub with which the internal toothed plate is engaged.

Fourth Embodiment

Figure 4:
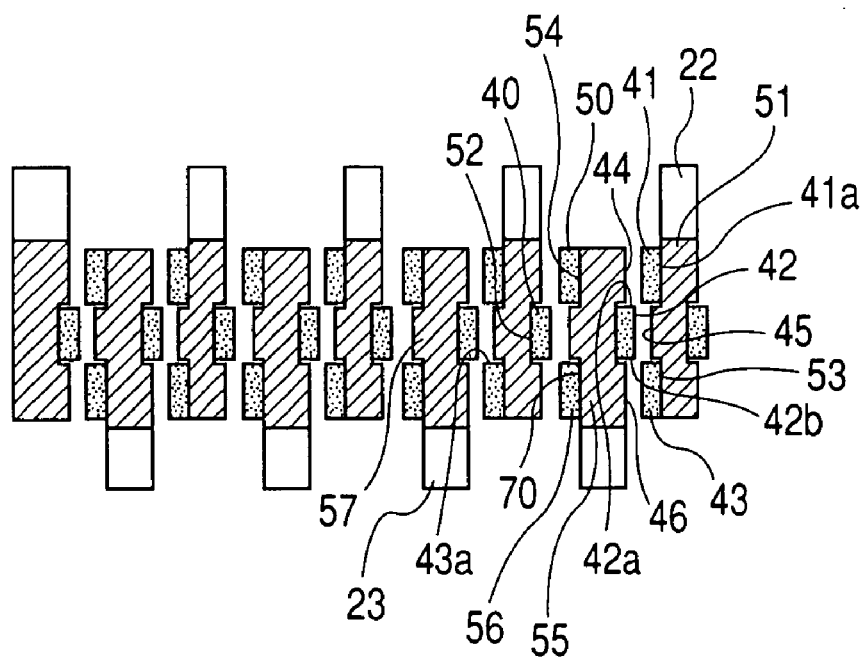
FIG. 4 is a sectional view showing details of external toothed plates and internal toothed plates according to a fourth embodiment of the present invention.

FIG. 4 is a sectional view showing details of external toothed plates 22 and internal toothed plates 23 of a wet multi-plate clutch according to a fourth embodiment of the present invention.

Each of external toothed plates 22 is provided at its one axial surface with a pair of outer and inner diameter side recessed portions 51 and 53, and a friction surface 45 is positioned between these recessed portions. A friction material 41 is stuck to the outer diameter side recessed portion 51 and a friction material 43 is stuck to the inner diameter side recessed portion 53. Further, the external toothed plate 22 is provided at its the other axial surface with a recessed portion 52 opposed to a region (friction surface 45) disposed between the recessed portions 51 and 53, and a friction material 42 is fitted into and stuck to the recessed portion 52.

Further, in each of axially-outermost external toothed plates 22, a friction material is stuck to only one surface of the plate. In the illustrated embodiment, regarding the left-most (FIG. 4) external toothed plate 22, a recessed portion 52 is provided in a surface of the plate opposed to an associated internal toothed plate 23 and a friction material 40 is fitted into this recessed portion. Further, regarding the right-most external toothed plate 22, recessed portions 51 and 53 are provided in a surface of the plate opposed to an associated internal toothed plate 23 and friction materials 41 and 43 are fitted into these recessed portions, respectively.

On the other hand, internal toothed plates 23 have substantially similar construction to those of the intermediate external toothed plates 22; that is to say, each internal toothed plates 23 is provided at its one axial surface with a pair of outer and inner diameter side recessed portions 54 and 56, and a friction surface 57 is positioned between these recessed portions. A friction material 50 is stuck to the outer diameter side recessed portion 54 and a friction material 70 is stuck to the inner diameter side recessed portion 56. Further, the internal toothed plate 23 is provided at its the other axial surface with a recessed portion 55 disposed between a friction surface 44 and a friction surface 46, and a friction material 42 is fitted into and stuck to the recessed portion 55.

In order to permit the friction material 42 stuck to the internal toothed plate 23 to abut against the friction surface 45 of the external toothed plate 22 between the friction materials 41 and 43 stuck to the external toothed plate 22, predetermined clearances or gaps are provided between an inner diameter side edge portion 41a of the friction material 41 and an outer diameter side edge portion 42a of the friction material 42 and between an outer diameter side edge portion 43a of the friction material 43 and an inner diameter side edge portion 42b of the friction material 42.

Accordingly, since the friction materials 41, 42 and 43 do not interfere with each other even when these friction materials are shifted in the axial direction, the engagement of the clutch is not obstructed.

Fifth Embodiment

Figure 5:
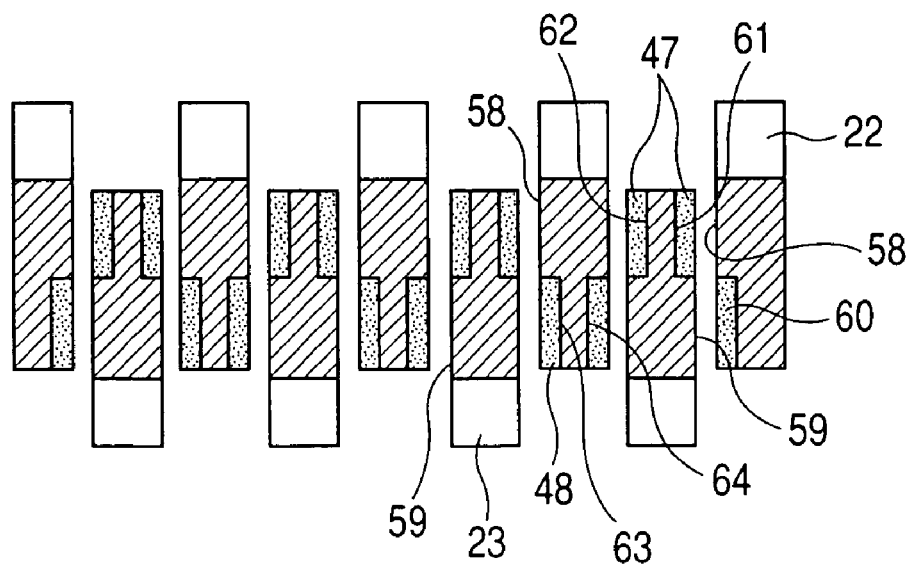
FIG. 5 is a sectional view showing details of external toothed plates and internal toothed plates according to a fifth embodiment of the present invention.

FIG. 5 is a sectional view showing details of external toothed plates 22 and internal toothed plates 23 of a wet multi-plate clutch according to a fifth embodiment of the present invention. A fundamental construction of the fifth embodiment is similar to that of the fourth embodiment.

In the fifth embodiment, each of the internal toothed plates 23 is provided at its both surfaces with recessed portions 61 and 62 at an outer diameter side thereof, and friction materials 47 are stuck to these recessed portions, respectively. Further, each of external toothed plates 22 is provided at its both surfaces with recessed portions 63 and 64 at an inner diameter side thereof, and friction materials 48 are stuck to these recessed portions, respectively. However, regarding axially-outermost external toothed plates 22, each plate is provided with a recessed portion 60 formed only in a surface opposed to the associated internal toothed plate 23 at an inner diameter side thereof, and a friction material 48 is stuck to the recessed portion.

The external toothed plates 22 are provided with friction surfaces 58 which are opposed to the friction materials 47 stuck to the internal toothed plates 23 and which can be slidingly contacted with these friction materials, and the internal toothed plates 23 are provided with friction surfaces 59 which are opposed to the friction materials 48 stuck to the external toothed plates 22 and which can be slidingly contacted with these friction materials.

As can be seen from FIG. 5, since each of the recessed portions of the external toothed plates 22 and the internal toothed plates 23 has an axial depth substantially the same as a thickness of each of the friction materials, outer (exposed) surfaces of the friction materials 48 stuck to the recessed portions 63 and 64 of the external toothed plates 22 become substantially flush with the friction surfaces 58. Similarly, outer (exposed) surfaces of the friction materials 47 stuck to the recessed portions 61 and 62 of the internal toothed plates 23 become substantially flush with the friction surfaces 59.

An inner diameter side edge portion of the friction surface 58 of the external plate 22 is radially offset from an outer diameter side edge portion of the friction surface 59 of the internal toothed plate 23 to provide a predetermined clearance or gap therebetween. Further, a similar clearance is provided between an outer diameter side edge portion of the friction material 48 stuck to the external toothed plate 22 and an inner diameter side edge portion of the friction material 47 stuck to the internal toothed plate 23. Accordingly, during the operation of the clutch, when the external toothed plates 22 and the internal toothed plates 23 are engaged with each other, the friction surfaces, as well as the friction materials do not interfere with each other so that the operation of the clutch is not obstructed.

A radial thickness of the friction material 48 stuck to the external toothed plate 22 is slightly greater than a radial thickness of the friction material 47 stuck to the internal toothed plate 23. That is to say, friction areas of the external toothed plate 22 are smaller than friction areas of the internal toothed plate 23.

In such a circumstance, to suppress heat unbalance caused by such difference in friction areas, an axial thickness of the internal toothed plate 23 can be selected to be greater than that of the external toothed plate 22.

Since the external toothed plate 22 is engaged or contacted with an element such as the clutch case or the transmission case having a heat capacity greater than that of the clutch hub with which the internal toothed plate 23 is engaged, by selecting the axial thickness of the internal toothed plate 23 to become greater than the thickness of the external toothed plate 22, heat dispersing abilities of the external toothed plate and the internal toothed plate can be equalized, thereby enhancing the heat resistance.

In the above-mentioned various embodiments, the friction materials are stuck to the front and rear surfaces of the core plates of the internal plates 23 and the external plates 22 asymmetrically. Further, the axial thicknesses of the respective core plates are regulated so that heat absorbing abilities of the external toothed plate 22 and the internal toothed plate 23 at their friction surfaces thereof becomes substantially the same.

Further, friction materials may be stuck to the internal toothed plate 23 or the external toothed plate 22 at plural positions offset in the radial direction. By sticking the friction materials to the opposed surfaces of the external toothed plates 22 and the internal toothed plates 23 and by sticking the friction materials to both surfaces of the external toothed plates 22 and the internal toothed plates 23, the friction heat can be absorbed from the both surfaces to reduce the heat unbalance between the plates, and, during an idle rotation, the external toothed plates 22 can be separated from the internal toothed plates 23, thereby reducing idle rotation drag.

The axial thickness of the friction material stuck to the external toothed plate 22 may differ from the axial thickness of the friction material stuck to the internal toothed plate 23. In this case, if necessary, a height (or depth) of the surface to which the friction material is stuck can be adjusted depending upon the thickness of the friction material.

In the above-mentioned various embodiments, since tooth face-pressures of the internal toothed plates and the external toothed plates can be reserved and the friction heat can be absorbed from both surfaces of the internal toothed plates and the external toothed plates, the heat resistance is not reduced and the tooth face-pressures can be maintained properly, thereby preventing indentation.

The friction material may be formed by punching the material in the form of a ring or may be formed by arranging a plurality of friction material segments in a ring shape. Further, a lubricating oil passage or an oil groove as a lubricating oil reservoir may be formed in the friction material. When the friction material is formed from the friction material segments, it is expected that gaps between the friction material segments can act as oil grooves.

In the internal toothed plates and the external toothed plates, the friction materials stuck to the outer diameter side regions of the plates and the friction materials stuck to the inner diameter side regions are formed from the same material; however, the friction materials may be formed from different materials. Further, it should be noted that the number of the friction materials disposed at plural positions along the radial direction is not limited to the illustrated numbers, but, any number of friction materials may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2006-103372 filed on Apr. 4, 2007, which is hereby incorporated by reference herein.

What is claimed is:

1. A wet multi-plate clutch comprising an external toothed plate formed by sticking a friction material to a core plate and an internal toothed plate formed by sticking a friction material to a core plate and arranged such that torque is transmitted by engaging said external toothed plate with said internal toothed plate, wherein:

each axial surface of said external toothed plate and said internal toothed plate has a respective recessed portion, and said friction materials are provided only on said recessed portions.

2. A wet multi-plate clutch according to claim 1, wherein a portion of the axial surface of said internal toothed plate without friction material thereon and a portion of the axial surface of said external toothed plate without friction material thereon do not interfere with each other.

3. A wet multi-plate clutch according to claim 1, wherein said friction materials are stuck to front and rear axial surfaces of said internal toothed plate and said external toothed plate asymmetrically.

4. A wet multi-plate clutch according to claim 1, wherein said friction material to be engaged at an outer diameter side is stuck to said internal toothed plate and said friction material to be engaged at an inner diameter side is stuck to said external toothed plate.

5. A wet multi-plate clutch according to claim 1, wherein axial thicknesses of said core plates are selected such that a heat absorbing capacity of a friction surface of said external toothed plate is substantially the same as a heat absorbing capacity of a friction surface of said internal toothed plate.

6. A wet multi-plate clutch according to claim 1, wherein a thickness of said core plate of said internal toothed plate is greater than a thickness of said core plate of said external toothed plate.

7. A wet multi-plate clutch according to claim 1, wherein depths of recessed portions of facing axial surfaces of said internal toothed plate and said external toothed plate are the same.

8. A wet multi-plate clutch according to claim 1, wherein a friction area of said friction material of said internal toothed plate is greater than a friction area of said friction material of said external toothed plate.

9. A wet multi-plate clutch according to claim 1, wherein an axial thickness of said core plate of said external toothed plate is greater than an axial thickness of said core plate of said internal toothed plate.

10. A wet multi-plate clutch comprising:

first and second friction plates, each friction plate having a pair of axial surfaces, each axial surface including a first surface portion with a friction material thereon and an exposed friction surface portion, the first surface portion being recessed with respect to said exposed friction surface portion, wherein the first and second friction plates are arranged such that the friction material on one of the axial surfaces of one of the first and second friction plates is opposed to the exposed friction surface portion of a facing axial surface of the other of the first and second friction plates for frictional engagement therewith, and friction material is provided only on the first surface portions of the first and second friction plates.

11. The wet multi-plate clutch according to claim 10, wherein one of the first and second friction plates is an external toothed plate and the other of the first and second friction plates is an internal toothed plate.

12. The wet multi-plate clutch according to claim 10, wherein the friction material on one of the first and second friction plates includes a plurality of friction material segments at different positions in a radial direction.

13. The wet multi-plate clutch according to claim 10, wherein the friction material on one of the axial surfaces of one of the first and second friction plates is asymmetrically arranged with respect to friction material on the other axial surface of said one of the first and second friction plates.

* * * * *